United States Patent
Yu et al.

(10) Patent No.: US 11,841,150 B2
(45) Date of Patent: Dec. 12, 2023

(54) METHOD FOR CONTROLLING POWER-ON OR POWER-OFF OF AIR CONDITIONER

(71) Applicant: GREE ELECTRIC APPLIANCES, INC. OF ZHUHAI, Guangong (CN)

(72) Inventors: Kai Yu, Guangdong (CN); Yaopeng Rong, Guangdong (CN); Ke Xu, Guangdong (CN); Qunbo Liu, Guangdong (CN); Yi Ni, Guangdong (CN); Longfei Li, Guangdong (CN)

(73) Assignee: Gree Electric Appliances, Inc. of Zhuhai, Guangdong (CN)

( * ) Notice: Subject to any disclaimer, the term of this patent is extended or adjusted under 35 U.S.C. 154(b) by 341 days.

(21) Appl. No.: 17/284,100

(22) PCT Filed: Dec. 12, 2018

(86) PCT No.: PCT/CN2018/120622
§ 371 (c)(1),
(2) Date: Apr. 9, 2021

(87) PCT Pub. No.: WO2020/077779
PCT Pub. Date: Apr. 23, 2020

(65) Prior Publication Data
US 2021/0348785 A1    Nov. 11, 2021

(30) Foreign Application Priority Data
Oct. 19, 2018    (CN) .......................... 201811219703.8

(51) Int. Cl.
*F24F 11/64* (2018.01)
*F25B 1/10* (2006.01)
(Continued)

(52) U.S. Cl.
CPC .............. *F24F 11/30* (2018.01); *F24F 11/64* (2018.01); *F24F 11/86* (2018.01); *F25B 1/10* (2013.01);
(Continued)

(58) Field of Classification Search
CPC .......... F25B 2400/0401; F25B 2500/26; F25B 2500/27; F25B 2600/25
See application file for complete search history.

(56) References Cited

FOREIGN PATENT DOCUMENTS

| CN | 101995110 | 3/2011 |
|---|---|---|
| CN | 101995110 A | 3/2011 |

(Continued)

OTHER PUBLICATIONS

International Search Report for PCT/CN2018/120622, dated Jul. 15, 2019. 2 pages.
(Continued)

*Primary Examiner* — Jerry-Daryl Fletcher
*Assistant Examiner* — Daniel C Comings
(74) *Attorney, Agent, or Firm* — Fish & Richardson P.C.

(57) ABSTRACT

A method for controlling the power-on or power-off of an air conditioner is provided. The method includes the following steps: determining whether a variable capacity compressor of the air conditioner is in a standby single-cylinder operation state before starting the air conditioner, where the variable capacity compressor is configured to be switchable between a single-cylinder operation state and a dual-cylinder operation state; if so, starting the air conditioner; if not, switching the variable capacity compressor to the standby single-cylinder operation state, and then starting the air conditioner. With this control method, regardless of whether the air conditioner is shut down because the power supply of the unit is cut off or because a power-off signal is received, the air conditioner can be started in a single-cylinder opera- (Continued)

tion state in the next startup, so that the operation state of the cylinder is always determined when starting the air conditioner.

9 Claims, 2 Drawing Sheets

(51) Int. Cl.
  *F24F 11/30* (2018.01)
  *F24F 11/86* (2018.01)
(52) U.S. Cl.
  CPC ....... *F25B 2500/02* (2013.01); *F25B 2500/26* (2013.01); *F25B 2600/0251* (2013.01)

(56) References Cited

FOREIGN PATENT DOCUMENTS

| | | | | |
|---|---|---|---|---|
| CN | 203375701 | | 1/2014 | |
| CN | 203375701 U | * | 1/2014 | ............... F24H 4/04 |
| CN | 203375701 U | | 1/2014 | |
| CN | 103940051 | | 7/2014 | |
| CN | 103940051 A | | 7/2014 | |
| CN | 206281240 | | 6/2017 | |
| CN | 206281240 U | * | 6/2017 | .............. F25B 13/00 |
| CN | 206281240 U | | 6/2017 | |
| CN | 105180372 | | 7/2018 | |
| JP | 3932921 | | 6/2007 | |
| JP | 3932921 B2 | | 6/2007 | |
| WO | WO 2020073488 | | 4/2020 | |

OTHER PUBLICATIONS

PCT International Search Report and Written Opinion in International Appln. No. PCT/CN2018/120622, dated Jun. 27, 2019, 13 pages (with English Translation).
Extended European Search Report in European Appln No. 18937413.5, dated Jun. 8, 2022, 6 pages.
International Preliminary Report on Patentability in International Appln. No. PCT/CN2018/120622, dated Apr. 14, 2021, 10 pages (with English translation).

* cited by examiner

METHOD FOR CONTROLLING POWER-ON OR POWER-OFF OF AIR CONDITIONER

CROSS-REFERENCE TO RELATED APPLICATIONS

This application is a U.S. National Phase application under 35 U.S.C. § 371 of International Patent Application No. PCT/CN2018/120622, filed on Dec. 12, 2018, which claims priority to Chinese application No. 201811219703.8 filed on Oct. 19, 2018, the disclosure of which is hereby incorporated herein by reference.

TECHNICAL FIELD

The present disclosure relates to the field of air conditioners, and more particularly, to a method for controlling the power-on or power-off of an air conditioner.

BACKGROUND

Compared with the ordinary multi-split air conditioner, the frequency conversion split air conditioner, based on volume switching of large and small cylinders, has its compressor adopting the design of large and small cylinders, and the large cylinder can be unloaded. Under medium and high loads, both cylinders of the compressor operate, and under low loads, only a single cylinder of the compressor operates.

The pressure at the variable capacity port of the compressor is changed by the high-pressure and low-pressure solenoid valves to switch between single-cylinder and dual-cylinder operation states. When the high-pressure solenoid valve is opened, high-pressure gas is introduced into the variable capacity port, and the compressor operates in dual cylinders; when the low-pressure solenoid valve is opened, low-pressure gas is introduced into the variable capacity port, and the compressor operates in a single cylinder.

The inventor found that there are at least the following problems in the related art: due to a fact that the compressor may be in a dual-cylinder operation state or in a single-cylinder operation state when the frequency conversion variable capacity split air conditioner is shut down, during the next startup, the cylinder status of the compressor cannot be confirmed, and the vibration of the compressor cannot be controlled, causing the stress and strain of the pipeline to be affected.

SUMMARY

According to some embodiments of the present disclosure, the present disclosure provides a method for controlling the power-on or power-off of an air conditioner, for optimizing the control method of the air conditioner and increasing the reliability of unit startup.

According to some embodiments of the present disclosure, the present disclosure provides a method for controlling the power-on or power-off of an air conditioner, including the following steps:
  determining whether a variable capacity compressor of the air conditioner is in a standby single-cylinder operation state before starting the air conditioner, where the variable capacity compressor is configured to be switchable between a single-cylinder operation state and a dual-cylinder operation state; and
  if so, starting the air conditioner; and if not, switching the variable capacity compressor of the air conditioner to the standby single-cylinder operation state, and then starting the air conditioner.

In some embodiments, the following steps are adopted to determine whether the variable capacity compressor is in a standby single-cylinder operation state:
  determining whether a last shutdown of the air conditioner is due to a receipt of a power-off signal; and if so, determining that the variable capacity compressor of the air conditioner is in the standby single-cylinder operation state.

In some embodiments, after starting the air conditioner, the method further includes the following steps:
  operating the air conditioner;
  determining whether the variable capacity compressor is currently in a single-cylinder operation state or a dual-cylinder operation state after the air conditioner receiving a power-off signal; and
  if the variable capacity compressor being in the dual-cylinder operation state, powering off the air conditioner, and then switching the variable capacity compressor to a standby single-cylinder operation state, so that the pressure at the variable capacity port of the variable capacity compressor is equal to the pressure at the air intake port of the variable capacity compressor; and if the variable capacity compressor being in the single-cylinder operation state, powering off the air conditioner.

In some embodiments, the following steps are adopted to switch the variable capacity compressor to the standby single-cylinder operation state:
  closing a second solenoid valve on a branch between the variable capacity port of the variable capacity compressor and an exhaust port of the variable capacity compressor, and opening a first solenoid valve on a branch between the variable capacity port of the variable capacity compressor and the air intake port of the variable capacity compressor.

In some embodiments, said switching the variable capacity compressor of the air conditioner to the standby single-cylinder operation state, so that the pressure at a variable capacity port of the variable capacity compressor is equal to the pressure at an air intake port of the variable capacity compressor, and then starting the air conditioner includes the following steps:
  switching the variable capacity compressor to the standby single-cylinder operation state;
  maintaining the variable capacity compressor in the standby single-cylinder operation state for a first preset period; and
  starting the air conditioner.

In some embodiments, the first preset period is 0 to 3 minutes.

In some embodiments, said if the variable capacity compressor being in the dual-cylinder operation state, powering off the air conditioner, and then switching the variable capacity compressor to a standby single-cylinder operation state, so that the pressure at the variable capacity port of the variable capacity compressor is equal to the pressure at the air intake port of the variable capacity compressor includes the following steps:
  powering off the air conditioner;
  switching the variable capacity compressor to a standby single-cylinder operation state; and
  maintaining the variable capacity compressor in the standby single-cylinder operation state for a second preset period.

In some embodiments, the second preset period is 0 to 3 minutes.

In some embodiments, the air conditioner includes a frequency conversion split air conditioner.

In some embodiments, said switching the variable capacity compressor to the standby single-cylinder operation state, and then starting the air conditioner includes:

switching the variable capacity compressor to the standby single-cylinder operation state, so that the pressure at the variable capacity port of the variable capacity compressor is equal to the pressure at the air intake port of the variable capacity compressor, and then starting the air conditioner.

In the above solutions, regardless of whether the air conditioner is shut down because the power supply of the unit is cut off or because a power-off signal is received, finally, before the next startup, the pressure at the variable capacity port of the variable capacity compressor is made substantially equal to the pressure at the air intake port of the compressor. Therefore, during the subsequent startup, the operation state of the cylinder of the air conditioner is always determined, and there will be no abnormal vibration caused by the high-pressure gas sealed by the variable capacity port.

DETAILED DESCRIPTION

The technical solutions provided in the present disclosure will be described in more detail below with reference to FIGS. 1-2.

An embodiment of the present disclosure provides a method for controlling the power-on or power-off of an air conditioner, configured for realizing the startup and shutdown control of the frequency conversion split air conditioner. An air conditioner structure on which the control method is based is described below.

Figure 1:
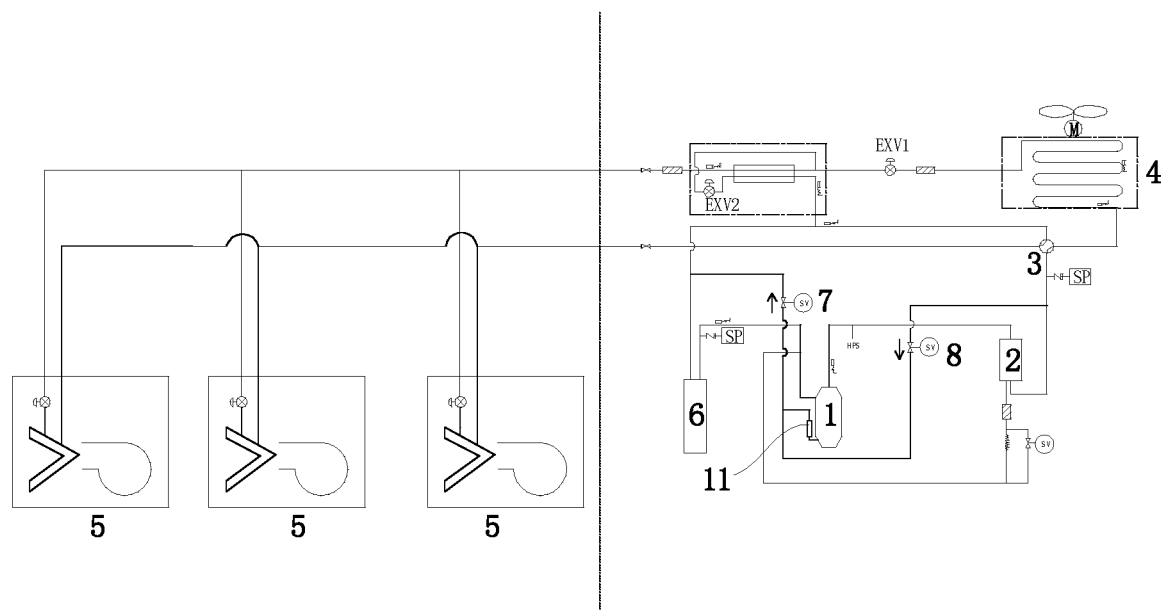
FIG. 1 is a schematic view showing the principle of an air conditioner according to an embodiment of the present disclosure.

Referring to FIG. 1, the air conditioner includes a variable capacity compressor 1, an oil separator 2, a four-way valve 3, a first heat exchanger 4, one or more second heat exchangers 5, and a gas-liquid separator 6. Two control branches are disposed at a variable capacity port 11 of the variable capacity compressor 1 for switching between single and dual cylinders of the variable capacity compressor 1. A first solenoid valve 7 is disposed on the branch between the variable capacity port of the variable capacity compressor 1 and an outlet of the gas-liquid separator 6. A second solenoid valve 8 is disposed on the branch between an outlet of the oil separator 2 and the variable capacity port 11 of the variable capacity compressor 1. Here, for example, the first heat exchanger 4 is used as an outdoor heat exchanger, and the second heat exchanger 5 is used as an indoor heat exchanger.

If the first solenoid valve 7 is in an ON state and the second solenoid valve 8 is in an OFF state, the variable capacity compressor 1 is in a single-cylinder mode. If the second solenoid valve 8 is in an ON state and the first solenoid valve 7 is in an OFF state, the variable capacity compressor 1 is in a dual-cylinder mode. The pressure at the variable capacity port 11 of the variable capacity compressor 1 is controlled by the first solenoid valve 7 and the second solenoid valve 8 to switch between single and dual cylinders. When the first solenoid valve 7 is opened, the variable capacity port 11 is connected to a low pressure, and the variable capacity compressor 1 is in a single-cylinder operation state. When the second solenoid valve 8 is opened, the variable capacity port 11 is connected to a high pressure, and the variable capacity compressor 1 is in a dual-cylinder operation state.

In this embodiment, the gas pressure at the variable capacity port 11 is changed for switching between single and dual cylinders of the variable capacity compressor 1. In this way, the on/off state of the solenoid valves connected to the variable capacity port 11 is determined to determine the single-cylinder and dual-cylinder states of the variable capacity compressor 1 during next startup. Of course, other means may also be used for switching between single and dual cylinders of the variable capacity compressor 1, and when other means are used, corresponding parameters need to be used to determine the state of the variable capacity compressor 1.

Figure 2:
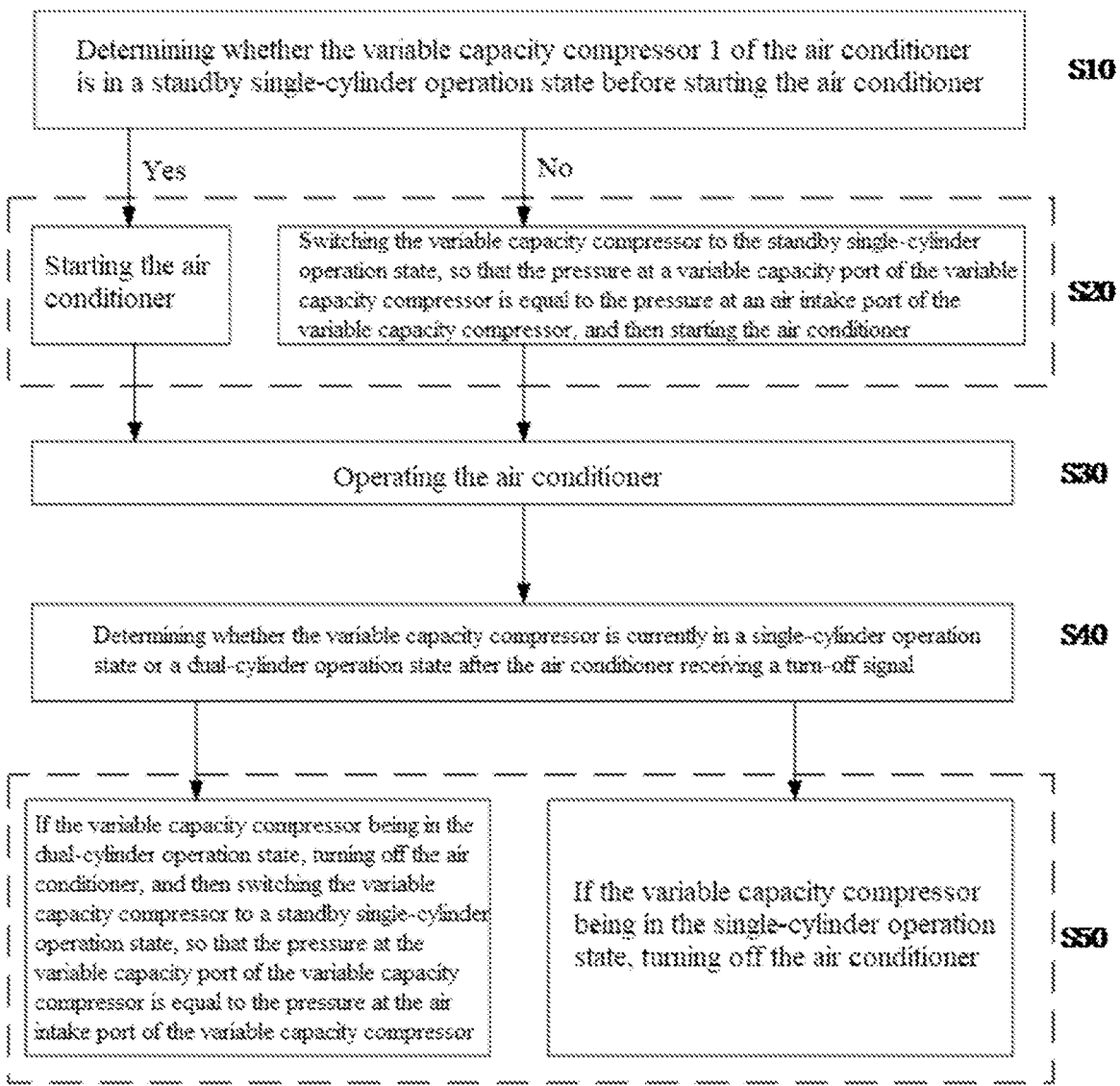
FIG. 2 is a schematic flowchart showing a method for controlling the power-on or power-off of an air conditioner according to an embodiment of the present disclosure.

Referring to FIG. 2, an embodiment of the present disclosure provides a method for controlling the power-on or power-off of an air conditioner, including the following steps:

Step S10: determining whether the variable capacity compressor 1 of the air conditioner is in a standby single-cylinder operation state before starting the air conditioner. The variable capacity compressor 1 is configured to be switchable between a single-cylinder operation state and a dual-cylinder operation state;

The single-cylinder operation state and the dual-cylinder operation state are based on a fact that the unit is in an operation state. The standby single-cylinder operation state is static, which means that the unit has not been started at this moment, but the piping connections and valve positions meet the requirements of single-cylinder operation.

If the variable capacity compressor 1 is in the standby single-cylinder operation state, step S30 is directly performed; if the variable capacity compressor 1 is not in the standby single-cylinder operation state, step S20 is performed.

A way to determine whether the variable capacity compressor 1 is in a single-cylinder operation state or a dual-cylinder operation state in a subsequent startup is to determine whether the air source connected to the variable capacity port 11 of the variable capacity compressor 1 is high pressure or low pressure. The high pressure here means that the variable capacity port 11 is connected to an exhaust port of the variable capacity compressor 1 or an outlet of the oil separator 2. The low pressure here means that the variable capacity port 11 is connected to the air intake port of the variable capacity compressor 1. The low pressure is approximately equal to the suction pressure of the variable capacity compressor 1.

Another way to determine whether the variable capacity compressor 1 is in a standby single-cylinder operation state is based on the reason of the last shutdown of the air conditioner. Specific steps are as follows:

First, obtaining the reason for the last shutdown of the air conditioner. The reasons for the shutdown include receiving a power-off signal and power failure shutdown.

Secondly, determining whether the variable capacity compressor 1 is in a standby single-cylinder operation state according to the obtained shutdown reason. If the reason for the shutdown is receiving a power-off signal, the variable capacity compressor 1 of the air conditioner is in a standby single-cylinder operation state. If the reason for the shutdown is power failure shutdown, it is considered that the variable capacity compressor 1 of the air conditioner is not in a standby single-cylinder operation state.

Step S20: if the variable capacity compressor 1 is in a standby single-cylinder operation state, directly starting the air conditioner; and if not, switching the variable capacity compressor of the air conditioner to the standby single-cylinder operation state, and then starting the air conditioner.

In the above step S20, specifically, the position of the sliding vane of the variable capacity compressor 1 is adjusted by changing the pressure at the variable capacity port 11, so that the variable capacity compressor 1 is in a standby single-cylinder operation state. That is, the variable capacity port 11 is connected to the air intake port of the variable capacity compressor 1.

Optionally, in step S20, firstly the variable capacity compressor of the air conditioner is switched to a standby single-cylinder operation state, so that the pressure at the variable capacity port of the variable capacity compressor is equal to the pressure at the air intake port of the variable capacity compressor, then the air conditioner is started. The pressure at the variable capacity port of the variable capacity compressor being equal to the pressure at the air intake port of the variable capacity compressor means that the pressure values are approximately equal, and the pressure values of the two are allowed to have a certain deviation.

In the above step S20, if the variable capacity compressor 1 is not in a standby single-cylinder operation state, performing the following steps:

First, switching the variable capacity compressor 1 to the standby single-cylinder operation state;

Secondly, maintaining the variable capacity compressor 1 in the standby single-cylinder operation state for a first preset period. In some embodiments, the first preset period is 0 to 3 minutes.

Finally, starting the air conditioner.

In some embodiments, the following steps are used to determine whether the variable capacity compressor 1 is in a standby single-cylinder operation state: determining whether a last shutdown of the air conditioner is due to a receipt of a power-off signal, and if so, determining that the variable capacity compressor 1 of the air conditioner is in the standby single-cylinder operation state.

If the last shutdown of the air conditioner is due to power failure shutdown, the state of the variable capacity compressor 1 of the air conditioner is uncertain, and before the power supply is cut off, the air conditioner may be in a single-cylinder operation state or in a dual-cylinder operation state. These cases are uniformly identified as that the variable capacity compressor 1 is not in a standby single-cylinder operation state. Therefore, in this way, there is no need to distinguish whether the air conditioner, before the power supply being cut off, is in a single-cylinder operation state or in a dual-cylinder operation state, and before starting the air conditioner, the variable capacity port 11 is connected with low-pressure gas, so that the pressure at the variable capacity port 11 of the variable capacity compressor 1 is equal to the pressure at the air intake port of the variable capacity compressor 1, and then step S30 is performed.

With the above step S20, before the air conditioner starts, the pressure at the variable capacity port 11 of the variable capacity compressor 1 can be made equal to the pressure at the air intake port, thus there will be no abnormal vibration phenomenon when startup, making the startup reliable.

In the above solutions, when the air conditioner is shut down normally, if the air conditioner is operating in a dual-cylinder operation mode before the shutdown, the pipeline of the air conditioner will be adjusted to a standby single-cylinder operation state after the shutdown, so that the pressure at the variable capacity port of the variable capacity compressor is equal to the pressure at the air intake port the compressor, and the air conditioner will not have abnormal vibration during the next startup. If the air conditioner is in a single-cylinder operation mode before the shutdown, it will be shut down normally. If the shutdown of the unit is not due to receiving a power-off signal, for example, the unit is shut down due to power failure, the variable capacity compressor of the unit is adjusted to a standby single-cylinder operation mode before the next startup, so that the pressure at the variable capacity port of the variable capacity compressor is equal to the pressure at the air intake port of the compressor, and then the air conditioner is started.

In some embodiments, the method for controlling the power-on or power-off of the air conditioner further includes the following steps:

Step S30: operating the air conditioner.

Step S40: determining whether the variable capacity compressor 1 is currently in a single-cylinder operation state or a dual-cylinder operation state after the air conditioner receiving a power-off signal.

Step S50: if the variable capacity compressor 1 being in the dual-cylinder operation state, powering off the air conditioner, and then switching the variable capacity compressor 1 to a standby single-cylinder operation state, so that the pressure at the variable capacity port 11 of the variable capacity compressor 1 is equal to the pressure at the air intake port of the variable capacity compressor 1; and if the variable capacity compressor 1 being in the single-cylinder operation state, powering off the air conditioner.

In the above step S50, with a normal shutdown, the state of the air conditioner remains unchanged, the air conditioner can be shut down in a single-cylinder operation state or in a dual-cylinder operation state. However, when in the dual-cylinder operation state, after the air conditioner being shut down, the variable capacity compressor 1 is switched to a standby single-cylinder operation state, so that the pressure at the variable capacity port 11 of the variable capacity compressor 1 is equal to the pressure at the air intake port of the variable capacity compressor 1.

In the above step S50, if the variable capacity compressor 1 is in a dual-cylinder operation state, specifically, the following steps are performed:

first, powering off the air conditioner;

secondly, switching the variable capacity compressor 1 to a standby single-cylinder operation state; and finally, maintaining the variable capacity compressor 1 in the standby single-cylinder operation state for a second preset period. In some embodiments, the second preset period is 0 to 3 minutes, such that, with this period, the pressure at the variable capacity port 11 of the variable capacity compressor 1 can be equal to the pressure at the air intake port of the variable capacity compressor 1.

It should be noted that the above-said equal pressure means that the pressure values are approximately equal, or in other words, the two pressures compared are allowed to have a certain deviation.

In the description of the present disclosure, it should be understood that orientation or positional relationship indicated by the terms of "central", "longitudinal", "transverse", "front", "rear", "left", "right", "vertical", "horizontal", "top", "bottom", "inner", "outer", etc., is based on the orientation or positional relationship shown in the drawings, only for the convenience of describing the present disclosure and simplifying the description, rather than indicating or implying that the referred device or element must have a specific orientation, or be constructed and operated in a specific orientation, therefore it cannot be understood as a limitation to the protection scope of the present disclosure.

Finally, it should be noted that the above embodiments are only used to illustrate the technical solutions of the present disclosure and are not intended to limit the present disclosure. Although the present disclosure has been described in detail with reference to the preferred embodiments, is should be understood by those of ordinary skill in the art should understand that the disclosed specific embodiments can still be modified or some of the technical features can be equivalently replaced without departing from the spirit of the technical solutions of the present disclosure, these modification and equivalent replacement should all be included in the scope of the technical solutions claimed by the present disclosure.

What is claimed is:

1. A method comprising:
   powering on an air conditioner comprising a variable capacity compressor, wherein the variable capacity compressor is configured to be switchable between a single-cylinder mode and a dual-cylinder mode, and wherein powering on the air conditioner comprises:
   before powering on the air conditioner, determining whether the variable capacity compressor is in the single-cylinder mode or the dual-cylinder mode, wherein determining whether the variable capacity compressor is in the single-cylinder mode or the dual-cylinder mode comprises:
      determining whether a last shutdown of the air conditioner is due to a receipt of a power-off signal, and
      responsive to determining that the last shutdown of the air conditioner is due to the receipt of a power-off signal, determining that the air conditioner is in the single-cylinder mode; and
   performing at least one of:
      responsive to determining that the variable capacity compressor is in the single-cylinder mode, powering on the air conditioner with the variable capacity compressor in the single-cylinder mode; or
      responsive to determining that the variable capacity compressor is in the double-cylinder mode, switching the variable capacity compressor to the single-cylinder mode, and subsequently powering on the air conditioner with the variable capacity compressor in the single-cylinder mode.

2. The method of claim 1, wherein the method further comprises:
   subsequent to powering on the air conditioner,
   receiving a power-off signal,
   prior to powering off the air conditioner, determining whether the variable capacity compressor is in the single-cylinder mode or the dual-cylinder mode, and
   performing at least one of:
      responsive to determining that the variable capacity compressor is in the dual-cylinder mode, powering off the air conditioner, and then switching the variable capacity compressor to the single-cylinder mode, such that that a pressure at a variable capacity port of the variable capacity compressor is equal to a pressure at an air intake port of the variable capacity compressor, wherein the pressure at the variable capacity port varies during operation of the air conditioning; or
      responsive to determining that the variable capacity compressor is in the single-cylinder mode, powering off the air conditioner.

3. The method of claim 2, wherein switching the variable capacity compressor to the single-cylinder mode comprises:
   closing a second solenoid valve on a branch between the variable capacity port of the variable capacity compressor and an exhaust port of the variable capacity compressor, and
   opening a first solenoid valve on a branch between the variable capacity port of the variable capacity compressor and the air intake port of the variable capacity compressor.

4. The method of claim 2, wherein switching the variable capacity compressor to the single-cylinder mode comprises:
   switching the variable capacity compressor to the single-cylinder mode;
   maintaining the variable capacity compressor in the single-cylinder mode for a first preset period; and
   starting the air conditioner subsequent to the first preset period.

5. The method of claim 4, wherein the first preset period is 0 to 3 minutes.

6. The method of claim 4, wherein powering off the air conditioner, and then switching the variable capacity compressor to the single-cylinder mode comprises:
   powering off the air conditioner;
   switching the variable capacity compressor to the single-cylinder mode; and
   maintaining the variable capacity compressor in the single-cylinder mode for a second preset period.

7. The method of claim 6, wherein the second preset period is 0 to 3 minutes.

8. The method of claim 1, wherein the air conditioner comprises a first cylinder and a second cylinder having a different size than the first cylinder.

9. The method of claim 1, wherein switching the variable capacity compressor to the single-cylinder mode, and subsequently powering on the air conditioner with the variable capacity compressor in the single-cylinder mode comprises:
   switching the variable capacity compressor to the single-cylinder mode, such that a pressure at a variable capacity port of the variable capacity compressor is equal to a pressure at an air intake port of the variable capacity compressor, and then starting the air conditioner.

* * * * *